United States Patent [19]
Kudoh

[11] Patent Number: 5,138,613
[45] Date of Patent: Aug. 11, 1992

[54] CONNECTION ESTABLISHING METHOD IN BROADCASTING PACKET COMMUNICATION AND PACKET COMMUNICATION SYSTEM HAVING FUNCTION OF AUTOMATICALLY SHUNTING A BROADCASTING PACKET

[75] Inventor: Norimasa Kudoh, Kawasaki, Japan
[73] Assignee: Kabushiki Kaisha Toshiba, Kawasaki, Japan
[21] Appl. No.: 491,471
[22] Filed: Mar. 9, 1990
[30] Foreign Application Priority Data
  Mar. 14, 1989 [JP] Japan .................................. 1-61733
[51] Int. Cl.⁵ .............................................. H04Q 11/04
[52] U.S. Cl. ..................................... 370/60; 370/94.1
[58] Field of Search ................. 370/60, 94.1, 110.1, 370/85.1

[56] References Cited
U.S. PATENT DOCUMENTS

| | | | |
|---|---|---|---|
| 4,679,189 | 7/1987 | Olson et al. | 370/60 |
| 4,704,716 | 11/1987 | Bowers et al. | 370/60 |
| 4,852,084 | 7/1989 | Verbiert et al. | 370/94.1 |
| 4,894,822 | 1/1990 | Buhrke et al. | 370/94.1 |
| 4,920,529 | 4/1990 | Sasaki et al. | 370/60 |

*Primary Examiner*—Douglas W. Olms
*Assistant Examiner*—Dang T. Ton
*Attorney, Agent, or Firm*—Finnegan, Henderson, Farabow, Garrett and Dunner

[57] ABSTRACT

In each of packet switching nodes making up a packet switching network, when it is desired to transfer a data packet between terminal and line interfaces, an identifier called an access channel number is attached to the data packet; whereas, when it is desired to transfer a data packet through multiplexing lines between line interfaces of adjacent packet switching nodes, an identifier called a transport channel number is attached to the data packet to specify the respective connections. In particular, when a broadcasting packet communication is specified wherein a common packet is to be transferred from a packet terminal to a plurality of destination packet terminals at the same time, the access channel number attached to the broadcasting packet to be transferred between the terminal and line interfaces is uniquely defined in the associated packet switching node; while the transport channel number attached to the broadcasting packet to be transferred through the multiplexing line between the line interfaces is uniquely defined between the adjacent packet switching nodes, so that the broadcasting packet is automatically branched as transferred into a plurality of specified transfer destinations.

4 Claims, 6 Drawing Sheets

CONNECTION ESTABLISHING METHOD IN BROADCASTING PACKET COMMUNICATION AND PACKET COMMUNICATION SYSTEM HAVING FUNCTION OF AUTOMATICALLY SHUNTING A BROADCASTING PACKET

BACKGROUND OF THE INVENTION

1. Field of the Invention

The present invention relates generally to a connection establishing method in broadcasting packet communication and a packet communication system having a function of automatically shunting or branching a broadcasting packet and more particularly, to a method and a system which can realize suitable broadcasting packet communication and also can eliminate any load concentration to a particular module or port, which might undesirably occur in a so-called broadcasting packet communication in which a common packet is transferred from a packet terminal to a plurality of destination packet terminals at the same time, thereby to prevent any local overload.

2. Description of the Related Art

Figure 1:
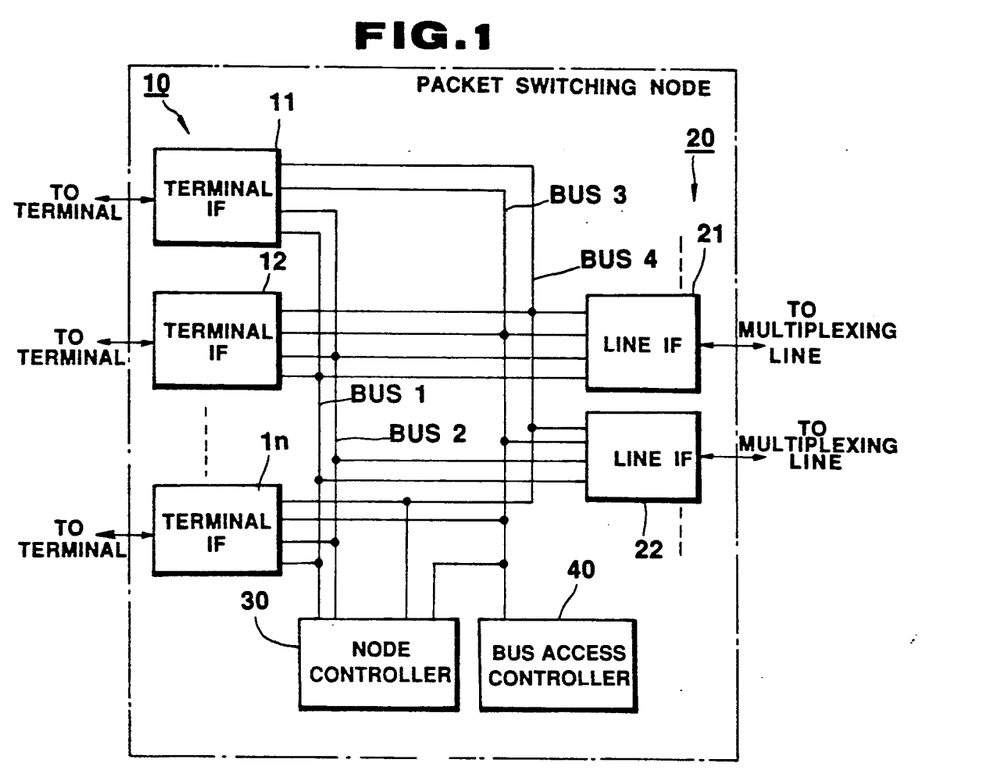
FIG. 1 is a block diagram schematically showing an arrangement of each of packet switching nodes in a packet switching network.

FIG. 1 shows, as an example, the internal arrangement of a packet switching node in a packet switching network.

The packet switching node of FIG. 1 includes a plurality of terminal interfaces 10 (11, 12, ... and 1n) provided as associated with packet terminals and to perform data exchange between these packet terminals and the present packet switching node, a plurality of line interfaces 20 (21, 22, ...) provided as associated with multiplexing lines in the packet switching network and to perform data exchange between these multiplexing lines and the associated packet switching node, an interrupt control bus BUS1, a control bus BUS2, an access control bus BUS3, a data bus BUS4, these buses being provided as intra-node buses between these terminal and line interfaces 10 and 20, a node controller 30 provided to generally control the terminal and line interfaces 10 and 20 to synthetically control the packet packet switching operation required every time in the node, and a bus access controller 40 provided to receive data-bus BUS4 occupation requests (access requests) issued from any ones of the interfaces to the access control bus BUS3 and to control and mediate the occupation right (access right) therebetween.

The operation of such a packet switching node will be briefly explained in the following.

Assume now that any one of the terminal interfaces 10 receives a calling packet from the associated packet terminal. Then the terminal interface, when receiving the calling packet, first sends an interrupt request to the node controller 30 through the interrupt control bus BUS1.

The node controller 30 in turn, when confirming the received interrupt request, gets access to the respective terminal interfaces 10 through the control bus BUS2 to check calling data (including a party destination number, a window size (the number of data which a terminal can send without permission of the associated terminal interface, i.e., without causing any buffer overflow), and so on) which are already registered at that time in a calling data memory (not shown) incorporated in each of the terminal interfaces. After having confirmed the calling data, the node controller 30 sends out the access request of the data bus BUS4 onto the access control bus BUS3.

The access request outputted thus onto the access control bus BUS3 is taken in the bus access controller 40, which in turn determines the then destination of the access right to be transferred under its control and mediation of the access right.

The node controller 30, only when obtaining the data bus access authority through such control and mediation of the bus access controller 40, transfers the connection request packet to the line interface 20 through the data bus BUS4. The line interface 20, when receiving the connection request packet from the node controller 30, prepares the received connection request packet in the same manner as for the data packet and transmits it to the associated multiplexing line.

The line interface 20, when transmitting the connection request packet and thereafter receiving a packet indicative of (informing) a connection approval or disapproval from the party packet terminal of the party node as an response to the transmission of the connection request packet, sends the response packet to the node controller 30.

The node controller 30, when receiving the response packet indicative of, for example, a connection approval, creates a connection table indicative of logical connection state between the line and terminal interfaces 20 and 10 in memories (not shown) provided within the interfaces 20 and 10 through the control bus BUS2, and sends the connection-approval informing packet to the corresponding terminal interface.

The terminal interface, when accepting the connection-approval informing packet from the node controller 30, further sends the accepted packet to the packet terminal which issued the aforementioned calling packet. This results in that the packet switching node is shifted to its data transfer phase.

In the data transfer phase, a data packet is sent from the terminal interface to the associated line interface logically connected thereto through the data BUS4.

Figure 2:
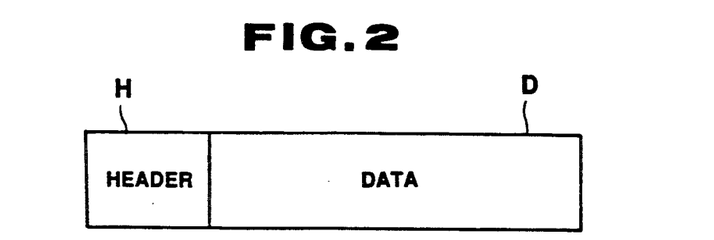
FIG. 2 schematically shows, in a model form, a structure of a data packet exchangingly transferred in the packet switching network.

At this time, the sent data packet has such a configuration as shown in FIG. 2.

More in detail, the data packet shown in FIG. 2 consists of a header field H and a data field D. Attached to the header field H is a connection data (connection identifier) of the data packet in question based on the logical connection contents of the connection table created by the node controller 30. Stored in the other data field D is the data contents of the data packet concerned.

The line interface, when receiving the data packet thus sent from the associated terminal interface, temporarily stores the received data pack in FIFO buffer (not shown) provided therein and at the same time, sequentially transmits the stored data to the associated multiplexing line.

When the communication between the caller and receiver packet terminals is completed and it is desired to cut off such a connection state therebetween, the same operation as in the previous connection request is executed except that the contents of the created connection table are deleted.

Figure 3:
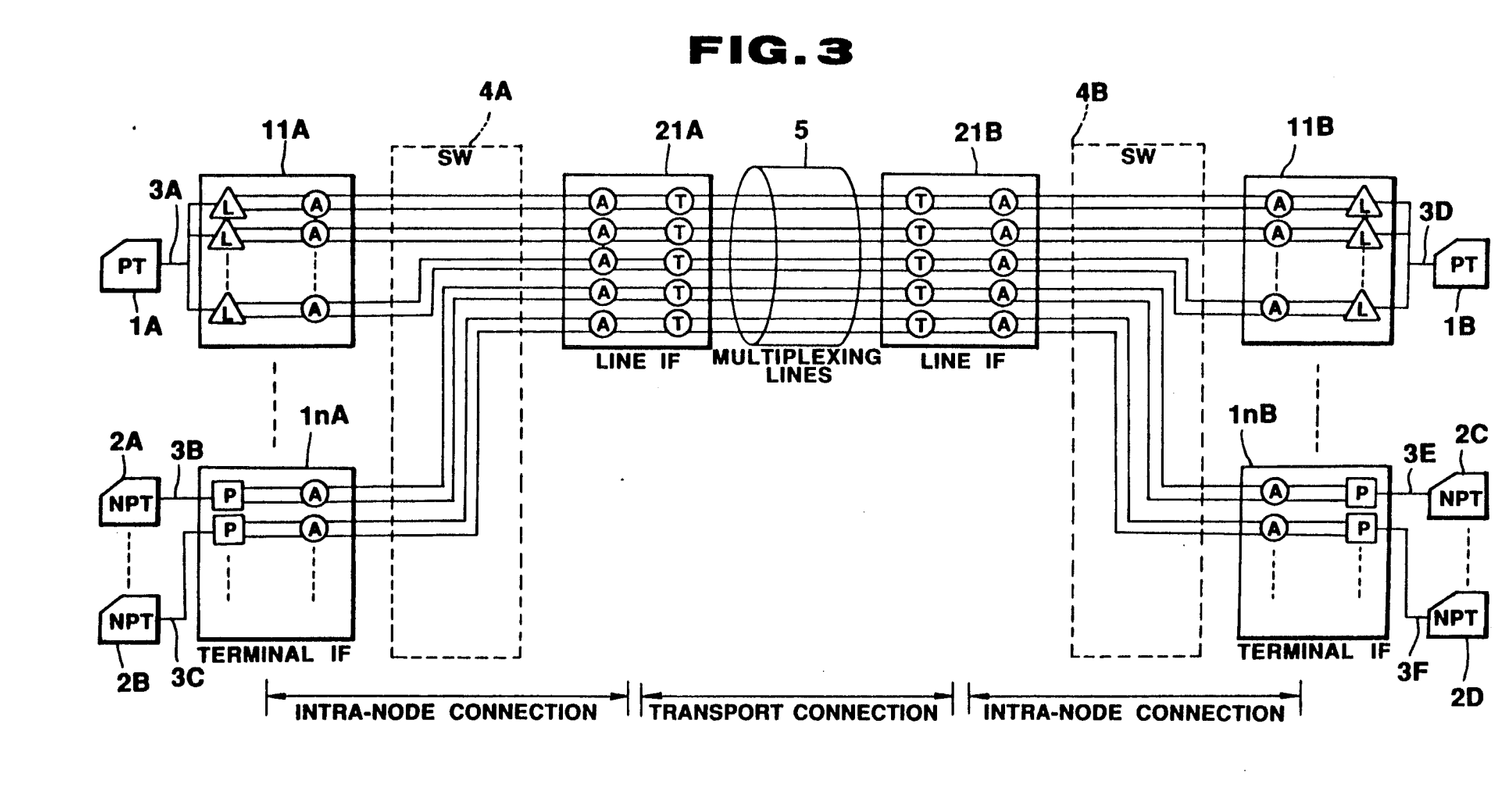
FIG. 3 is a block diagram showing, in a model form, the conception of how to establish connections between communication elements at the time of transferring a packet in the packet switching network.

A relationship between the interconnection of the caller to receiver packet terminals and the connection table will next be detailed by referring to FIG. 3.

In the drawing, reference symbols 1A and 1B denote packet format terminals (which will be sometimes referred to merely as the packet terminals PT, hereinafter)

in question, 2A to 2D denote non-packet format terminals (which will be sometimes referred to as merely as the non-packet terminals NPT, hereinafter), 3A to 3F low rate lines, 4A and 4B switches for selecting packet transmission lines established through the buses BUS1 to BUS4, reference numeral 5 multiplexing lines, respectively. In addition, reference symbols 11A, . . . 1nA, 11B, . . . and 1nB denote terminal interfaces (which correspond to the aforementioned terminal interfaces 10 in FIG. 1) in illustrated both nodes, and 21A and 21B denote line interfaces (which correspond to the aforementioned line interfaces 20 in FIG. 1) in the both nodes, respectively.

In the illustrated example, board addresses BA unique to the associated boards housed in the corresponding nodes are set to the terminal interfaces 11A, . . ., 1nA, 11B, . . . and 1nB respectively.

The terminal interfaces 11A and 11B are connected with the associated packet terminals (PTs) 1A and 1B, have logical channel numbers LCN and access channel numbers ACN set thereto respectively. The logical channel numbers LCN indicate the numbers of logical channels connecting these packet terminals 1A and 1B respectively; while the access channel numbers ACN, which correspond to the logical channel numbers LCN in a 1:1 relation, indicate connection relationships between the line interfaces 21A and 21B respectively.

Meanwhile, the terminal interfaces 1nA and 1nB, which are connected with the associated non-packet terminals (NPTs) 2A to 2D, have physical channel numbers PCN and access channel numbers ACN set thereto respectively. The physical channel numbers PCN indicate the numbers of physical channels connecting these non-packet terminals 2A and 2B respectively; whereas the access channel numbers ACN, which correspond to the physical channel numbers PCN in a 1:1 relation, indicate connection relationships between the line interfaces 21A and 21B respectively.

Similarly to the aforementioned terminal interfaces, the line interfaces 21A and 21B have board addresses BA unique to the associated nodes and access channel numbers ACN indicative of connection relationships with respect to the associated terminal interfaces. Also set, in particular, to these line interfaces 21A and 21B a.. transport channel numbers TCN which are uniquely determined with respect to the respective adjacent nodes.

In FIG. 3, the logical channel number LCN is denoted by "L", the access channel number ACN by "A", the physical channel number PCN by "P", the transport channel number TCN by "T", respectively. For the simplicity of the drawing. In addition, node controllers, bus access controllers and so on associated with the both nodes are omitted.

Here consider a logical channel connection between, for example, the packet terminals (PTs) 1A and 1B. Then the logical channel (LCN) of the packet terminal 1A is sequentially associated with one of the access channels (ACN) of the terminal interface 11A, with one of the access channels (ACN) and one of the transport channels (TCN) of the line interface 21A, with one of the transport channels (TCN) and one of the access channels (ACN) of the line interface 21B, with one of the access channels (ACN) of the terminal interface 11B, and finally with the logical channel (LCN) of the packet terminal 1B. Thus, it will be appreciated that, the connection relationship between the packet terminals can be completely described in terms of roughly three sorts of connection data, i.e., intra-node, transport and intra-node connections as shown in FIG. 3.

More specifically, in the case where it is considered to transmit a packet from the packet terminal 1A to the packet terminal 1B, when the following relationships (a) to (g) are determined, the relationship between the packet terminals 1A and 1B in question can be uniquely specified.

(a) A relationship between the logical channel number LCN of the packet terminal 1A and the access channel number ACN of the terminal interface 11A.

(b) A relationship between the access channel number ACN of the terminal interface 11A and the access channel number ACN of the line interface 21A.

(c) A relationship between the access channel number ACN of the line interface 21A and the transport channel number TCN used between the line interfaces 21A and 21B.

(d) A relationship between the transport channel number TCN used between the line interfaces 21A and 21B and the access channel number ACN of the same interface 21B.

(e) A relationship between the access channel number ACN of the line interface 21B and the access channel number ACN of the terminal interface 11B.

(f) A relationship between the access channel number ACN of the terminal interface 11B and the logical channel number LCN of the packet terminal 1B.

In this connection, it is common that the relationship between the logical channel number LCN and access channel number ACN in the each terminal interface is determined, in many cases, at the time of configuring the system; while the relationship between the access channel number ACN of the terminal interface and the access channel number ACN of the line interface as well as the relationship between the access channel number ACN and transport number TCN in the each line interface are determined every time when a calling connection is desired.

Therefore, when only ones of the relationships (a) to (f) which are determined every time at the time of the calling connection are c'  ribed in the aforementioned connection table in the corresponding terminal or line interface, the connection relationship between the packet terminals 1A and 1B concerned can be logically and uniquely specified. The description of such connection relationship in the connection table is carried out under the node controller 30 (see FIG. 1) of the associated node as already explained earlier.

Each time the data packet is actually transferred, the terminal or line interface, when receiving the data packet, checks whether the data packet is directed to its own board. When the terminal or line interface determines the data packet directed to its own board, it sequentially rewrites the contents (such as the aforementioned channel numbers LCN, ACN and TCN and so on) of the connection identifier attached to the header H (see FIG. 2) of the data packet in question and also the aforementioned board address BA, on the basis of the contents described in its own connection table. Such operations are sequentially repeated.

At the end of the communication, the node controller 30 of the associated node sequentially erases the contents described in the connection table, whereby the connection relationship in question is released (disconnected).

In packet communication based on such packet switching network, there is sometimes carried out, in addition to the above 1:1 communication between the two packet terminals, such broadcasting packet communication that a packet is commonly transferred from one packet terminal to a plurality of other destination packet terminals at the same time, that is, in a 1:N relation.

Figure 4:
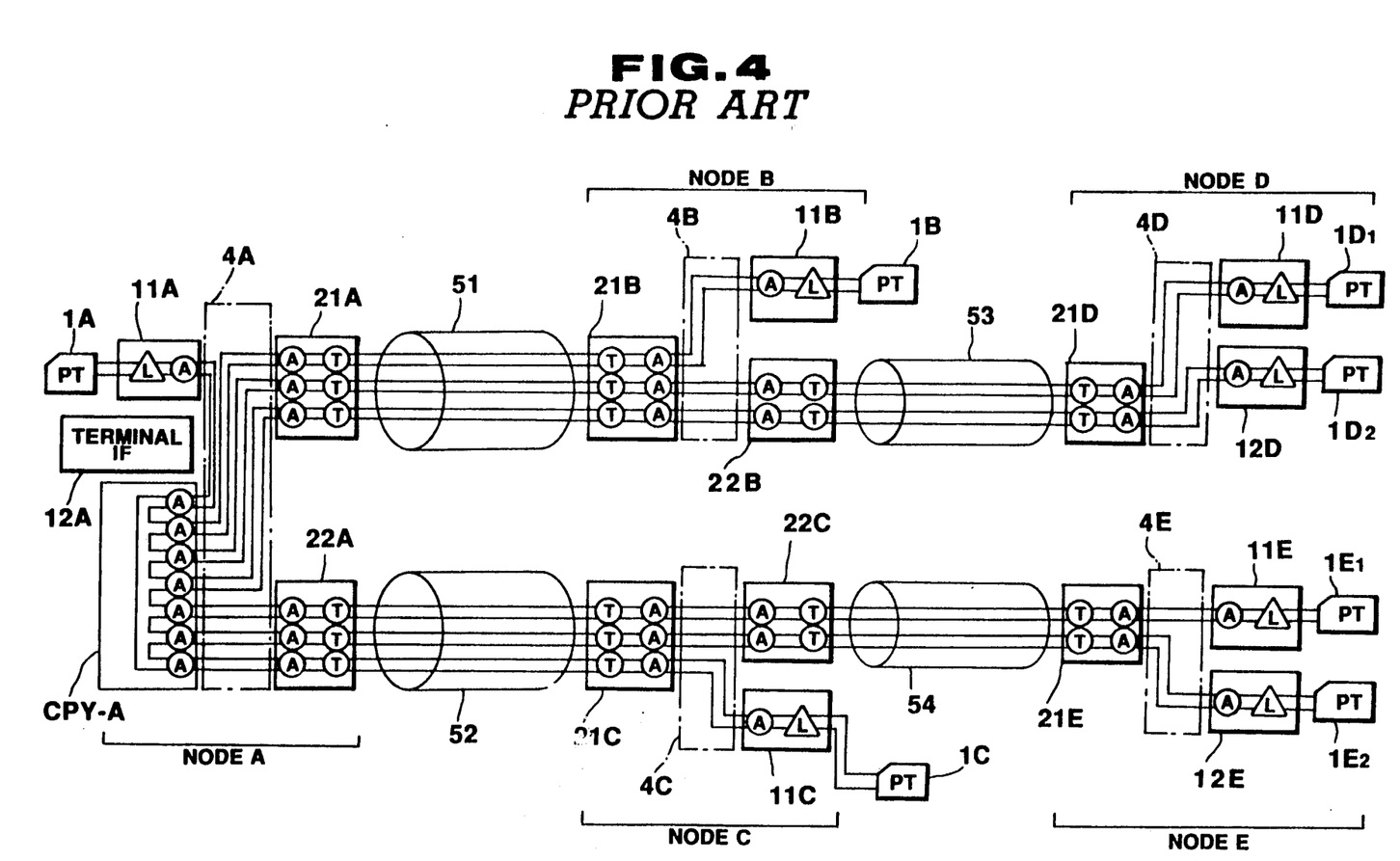
FIG. 4 is a block diagram showing, in a model for, the conception of how to establish connections in a prior art broadcasting packet communication.

FIG. 4 is a diagram for explaining how broadcasting communication is conventionally effected in the packet switching network.

More in detail, FIG. 4 shows a 1:6 broadcasting communication example wherein reference symbols 1A, 1B, 1C, 1D1, 1D2, 1E1 and 1E2 denote packet terminals (PTs) and a packet is to be transferred from the packet terminal 1A connected to a node A, to the packet terminal 1B connected to a node B, to the packet terminal 1C connected to a node C, to the packet terminals 1D1 and 1D2 connected to a node D, and to the packet terminals 1E1 and 1E2 connected to a node E.

Also included in FIG. 4 are terminal interfaces 11A and 12A in the node A, line interfaces 21A and 22A in the node A, a switch 4A in the node A, a terminal interface 11B in the node B, line interfaces 21B and 22B in the node B, a switch 4B in the node B, a terminal interface 11C in the node C, line interfaces 21C and 22C in the node C, a switch 4C in the node C, terminal interfaces 11D and 12D in the node D, a line interface 21D in the node D, a switch 4D in the node D, terminal interfaces 11E and 12E in the node E, a line interface 21E in the node E, a switch 4E in the node E, multiplexing lines 51 connected between the nodes A and B, multiplexing lines 52 connected between the nodes B and D, multiplexing lines 54 connected between the nodes C and E, and a data copy unit CPY-A provided in the caller node A to a copy the data field D (see FIG. 2) of a data packet to be transferred. Even in FIG. 4, node controllers, bus access controllers and so on associated with the respective nodes are omitted for the simplicity of the drawing.

Prior to execution of such 1:6 broadcasting communication, it is first necessary that the access channel numbers ACN issued from the terminal interface 11A (node A) of the calling terminal 1A should correspond to the associated 6 party terminals of call receivers.

To this end, in the illustrated example, when the caller terminal 1A issues a broadcasting communication request to the 6 packet terminals, the access channel numbers ACN issued from the terminal interface 11A are connected to the data copy unit CPY-A copy the data field D of the associated data packet through the data copy unit and also the access channel numbers ACN contained in the header H are rewritten so as to correspond to the 6 associated call receivers in the node A. The rewriting operation of such access channel numbers ACN also requires the use of a connection table (not shown) previously prepared in the data copy unit CPY-A. Through the copying operation of the packet data and the rewriting operation of the access channel numbers ACN at the data copy unit CPY-A, there are newly created 6 sorts of data packets which have the headers H containing connection identifiers corresponding to the 6 associated call receivers and also have the data fields D containing all the same contents. For the 6 data packets thus created, for example, such 6 connections as shown in FIG. 4 are established between the line interfaces 21A and 22A of the node A.

In the nodes (nodes B to E in the illustrated example) connected with the specified party packet terminals, connections between the line interfaces 21A and 22A and the packet terminals controlled by the respective nodes are set in the corresponding connection tables in response to a call indicative of the broadcasting communication request from the packet terminal 1A through the node A. As also shown even in FIG. 4, in the nodes (node B for the relay of the data packet to the node D and node C for the relay of the data packet to the node E, in the illustrated example) necessary for the relay of the data packet, such a connection as to pass the data packet therethrough toward the relay target node is also separately set in the corresponding connection table.

In this way, through the above connection setting processing at the associated nodes (nodes A and B to E), the single data packet issued from the caller terminal 1A is processed as follows.

(1) The data packet is re-organized at the data copy unit CPY-A of the node A into 6 sorts of data packets which have the same data contents and which have the headers H containing connection identifiers corresponding to the 6 party destinations.

(2) The 6 sorts of re-organized data packets are sequentially transferred or relayed to the target nodes having the specified packet terminals connected thereto, basically in accordance with such a procedure as explained in FIG. 3.

In this manner, the 6 re-organized data packets eventually reach the 6 packet terminals 1B, 1C, 1D1, 1D2, 1E1 and 1E2 as transfer destinations.

In such broadcasting communication as mentioned above, when it is desired to transfer a common data to a plurality of destination packet terminals at the same time, the need for the execution of the every-time separate calling procedure can be eliminated. However, when it is desired to establish a connection between nodes or packet terminals as the broadcasting communication, it is necessary to establish 1:N connections at the data copy unit CPY-A and to transfer the packets on the-established-connection basis, whether the connections are established logically or physically. For this reason, such a prior art packet communication system has had the following problems (A), (B) and (C), when explanation is made, for example, in connection with the example of FIG. 4.

(A) The occupation time of the switch 4A in the node A as a packet transmitter end becomes large and thus the delay time of communication in another connection becomes large.

(B) Since it becomes necessary to transmit packets on the one-packet-to-one-connection basis though the packets have the same contents, the data copy unit CPY-A tends to become overloaded.

(C) For the similar reason to the (B), the multiplexing-line occupation factor becomes high. For example, the multiplexing lines 51 between the nodes A and B or the multiplexing lines 52 between the nodes A and C must have a transmission band corresponding to 3 times the transmission band of the same packet. This largely prevents the utilization of the multiplexing lines in question in another communication to an unnegligible extent.

SUMMARY OF THE INVENTION

In view of such circumstances, it is an object of the present invention to provide a connection establishing method and a packet communication system having a function of automatically shunting a broadcasting packet in a broadcasting packet communication, which can eliminate load concentration to a specific module or board, which would undesirably occur in the prior art broadcasting packet communication, to prevent any local overload and thus realize a suitable broadcasting packet communication.

In order to obtain the above object, the present invention is arranged so that when a call is set to logically connect two of the packet terminals and to transfer a packet between the two connected packet terminals, connection identifiers indicative of next connection destinations are sequentially attached to the packet through the packet terminals, the terminal interface, the line interface and the multiplexing lines to specify the then packet receiver; whereas, when the broadcasting packet communication is specified to transfer a common packet from one packet terminal to a group of selected packet terminals at the same time, the packet transferred between the terminal and line interfaces is attached with a first connection identifier uniquely defined in the associated packet switching node, while the packet transferred between the line interfaces of the adjacent packet switching nodes is attached with a second connection identifier uniquely defined between the adjacent nodes.

More specifically, an access channel number attached as a connection identifier to a broadcasting packet to be transferred between the terminal and line interfaces is uniquely defined in the associated packet switching node; while a transport channel number attached as a connection identifier to the broadcasting packet to be transferred through the multiplexing line between the line interfaces is uniquely defined between the mutually adjacent packet switching nodes. In this case, even when the packet to be transferred between the terminal and line interfaces has additionally a board address attached thereto as a connection identifier, the board address is ignored.

Thus, in each of the terminal or line interfaces of packet switching nodes specified as broadcasting-packet receivers or relays in the call setting mode, the corresponding interface or interfaces are simultaneously in parallel specified (seized) based on the same access channel number previously set. In addition, even for a packet to be transferred between adjacent packet switching nodes, the corresponding multiplexing lines between the associated line interfaces of the adjacent packet switching nodes are connected thereto (that is, put in their through-state) based on the preset transport channel numbers.

As a result, the broadcasting packet issued from the caller terminal is automatically transferred by branching to a plurality of desired destinations while the need for such processing as data copy processing mentioned earlier is eliminated.

In this way, in accordance with the present invention, load concentration to a specific module or board, which would undesirably take place in the prior art broadcasting packet communication system, can be avoided. In addition, the occupation factor of the switches or multiplexing lines can be also made low.

DESCRIPTION OF THE PREFERRED EMBODIMENT

Figure 5:
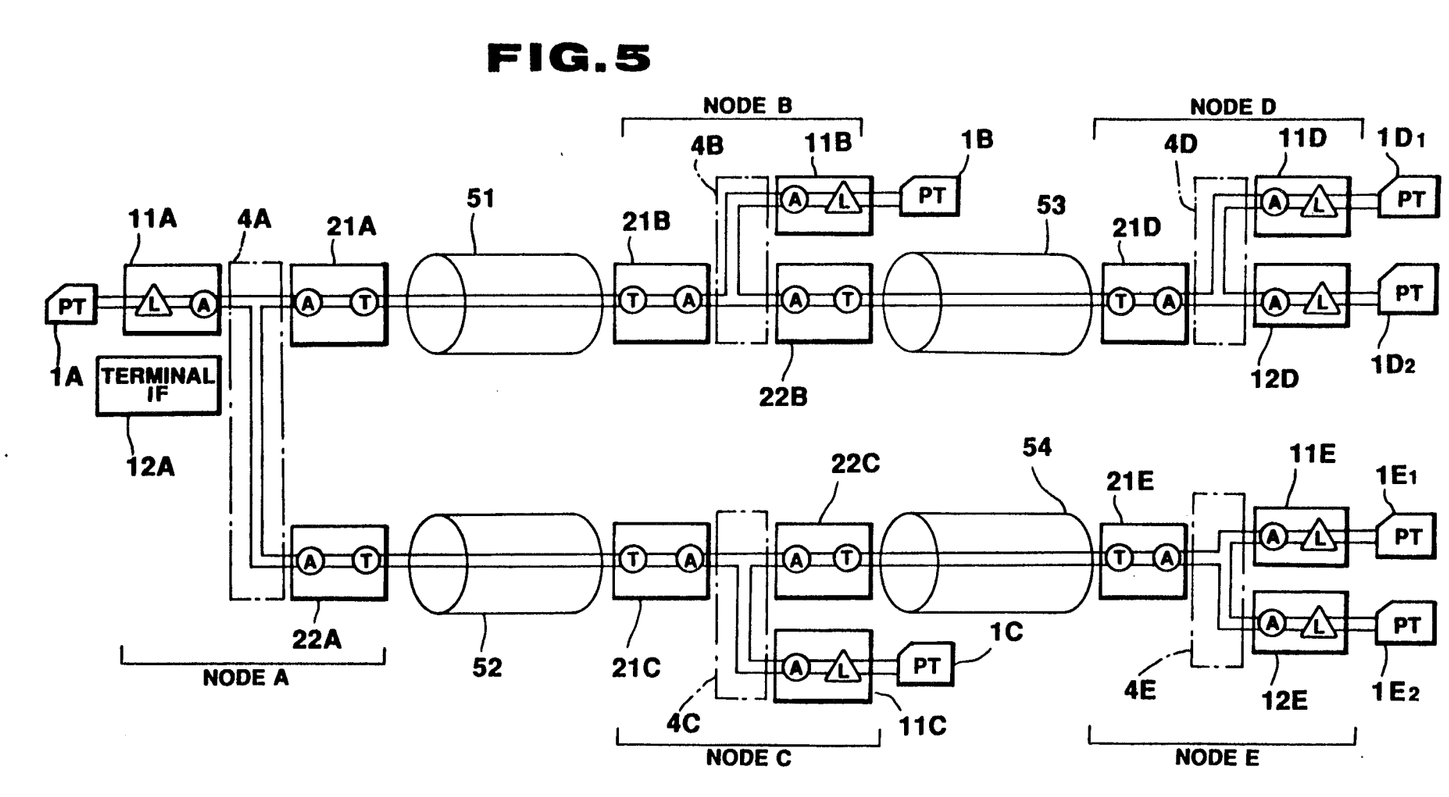
FIG. 5 is a block diagram showing the conception of how to establish connections in a broadcasting packet communication system of the present invention.

Referring to FIG. 5, there is shown a connection establishing method in a broadcasting packet communication system in accordance with an embodiment of the present invention.

As in FIG. 4, the embodiment of FIG. 5 is also intended to carry out a 1/6 broadcasting packet communication, that is, to transfer a packet from a packet terminal (PT) 1A connected to a node A, to 6 packet terminals (PTs) 1B, 1C, 1D1 and 1D2, and 1E1 and 1E2, which are connected to nodes B, C, D, and E respectively.

Even in FIG. 5, elements having substantially the same functions as those in FIG. 4 are denoted by the same reference symbols and explanation thereof is omitted.

When it is desired to carry out the 1:6 broadcasting packet communication, it is first necessary, in the prior art, for the data copy unit CPV-A (refer to FIG. 4) to receive and sequentially rewrite the access channel numbers ACN issued from the terminal interface 11A (node A) of the calling terminal 1A into ones corresponding respectively to the 6 call receivers. In the connection established method of the present invention, when the broadcasting packet communication is specified, a connection identifier uniquely defined in the associated packet switching node is attached to a packet transferred between the terminal and line interfaces of the corresponding packet switching node, while a connection identifier uniquely defined between adjacent packet switching nodes is attached to a packet transferred between the line interfaces of the adjacent nodes through the multiplexing lines.

That is, in the embodiment system exemplified in FIG. 5, when the caller terminal 1A specifies the 6 call receivers and issues a broadcasting communication request therefor, the system sequentially executes, in its call setting mode, connection establishing operations which follow with respect to the respective nodes A to E.

Node A:

(1) The system defines transport channel numbers TCN 8 (for example, TCNA1-B1 and TCNA2-C1) respectively having unique contents between the adjacent nodes B and C corresponding to the call receivers to secure the multiplexing lines between the adjacent nodes B and C.

(2) The system registers the defined transport channel numbers TCN in the connection tables (not shown) of the line interface (21A and 22A in the illustrated embodiment) associated with the secured multiplexing lines.

(3) The system defines an access channel number ACN (for example, ACNA1) having unique contents in the node A between the terminal inteface 11A having a data packet received from the caller terminal 1A and the line interfaces 21A and 22A corresponding to the above secured multiplexing lines.

(4) The system registers the same access channel number ACN defined in the connection tables (not shown) in the associated terminal and line interfaces 11A, 21A and 22A.

Node B:

(1) The system defines transport channel numbers TCN (for example, TCNA1-B1 and TCNB2-D1) each having unique contents between the adjacent nodes A and D corresponding to the caller and relay nodes to secure multiplexing lines between the adjacent nodes A and D.

(2) The system registers the above defined transport channel numbers TCN in the connection tables (not shown) of the line interfaces (21B and 22B in the illustrated embodiment) corresponding to the secured multiplexing lines.

(3) The system defines an access channel number ACN (for example, ACNB1) having unique contents in the node B between the terminal interface 11B connected with the packet terminal 1B which is specified as one of the broadcasting communication destinations and the line interfaces 21B and 22B corresponding to the above secured multiplexing lines.

(4) The system regis.ers the same access channel number ACN de$\lambda$.ed in the above (3) in the respective connection tables (not shown) of the associated terminal and line interfaces 11B, 21B and 22B.

Node C:

(1) The system defines transport channel numbers TCN (such as TCNA2-C1 and TCNC2-E1) respectively having unique contents between the adjacent nodes A and E corresponding to the caller and relay nodes to secure multiplexing lines between the adjacent nodes A and E.

(2) The system registers the above defined transport channel numbers TCN in the connectiont tables (not shown) of the line interfaces (21C and 22C in the illustrated embodiment) corresponding to the secured multiplexing lines.

(3) The system defines an access channel number ACN (such as ACNC1) having unique contents in the node C between the terminal interface 11C connected with the packet terminal 1C specified as one of the broadcasting communication destinations and the line interfaces 21C and 22C corresponding to the secured multiplexing lines.

(4) The system registers the same access channel number ACN defined in the above (3) in the respective connection tables (not shown) of the associated terminal and line interfaces 11C, 21C and 22C.

Node D:

(1) The system defines a transport channel number (such as TCNB2-D1) having unique contents with respect to the adjacent node B to secure multiplexing lines with respect to the adjacent node B.

(2) The system registers the above defined transport channel number TCN in the connection table (not shown) of the line interface (21D in the illustrated embodiment) corresponding to the secured multiplexing lines.

(3) The system defines an access channel number ACN (such as ACND1) having unique contents in the node D between the terminal interface 11D connected with the packet terminal 1D1 specified as one of the broadcasting communication destinations, the terminal interface 12D connected with the packet terminal 1D2 speicfied as one of the broadcasting communication destinations, and the line interface 21D corresponding to the secured multiplexing lines.

(4) The system registers the same access channel number ACN defined in the above (3) in the respective connection tables (not shown) of the associated terminal and line interfaces 11C, 12D and 21D.

Node E:

(1) The system defines a transport channel number TCN (such as TCNC2-E1) having unique contents with respect to the adjacent node C to secure multiplexing lines with respect to the adjacent node C.

(2) The system registers the transport channel number TCN defined in the above (1) in the connection table (not shown) of the line interface (21E in the illustrated embodiment) corresponding to the secured multiplexing lines.

(3) The system defines an access channel number ACN (such as ACNE1) having unique contents in the node E between the terminal interface 11E connected with the packet terminal 1E1 specified as one of the broadcasting communication destinations, the terminal interface 12E connected with the packet terminal 1E2 specified as one of the broadcasting communication destinations, and the line interface 21E corresponding to the secured multiplexing lines.

(4) The system registers the sme access channel number ACN defined in the above (3) in the respective conneciton tables (not shown) of the associated terminal and line interfaces 11E, 12E and 21E.

When connections are established between nodes in the aforementioned manner in the call setting mode and the caller terminal 1A actually issues a broadcasting data packet, the data packet is reached to all the previously specified packet destination terminals through the following procedures (1) to (11) explained in connection with FIG. 5.

(1) The data packet is inputted to the terminal interface 11A of the node A where an access channel number ACN (such as ACNA1) uniquely defined in the node A is attached to the header H (refer to FIG. 2) of the inputted data packet (in other words, the connection identifier contained in the header H is rewritten to the access channel number 11A).

(2) For this reason, the packet, when outputted from the terminal interface 11A, is automatically branched into the line interfaces 21A and 22A of the node A as one and other packets.

(3) The header H of one packet inputted to the line interface 21A is rewritten to a transport channel number TCN (such as TCNA1-B1) uniquely defined between the nodes A and B, and the header-rewritten packet is transfered to the node B through the multiplexing line corresponding to the number TCN and further to the line interface 21B of the node B. The other packet, on the other hand, inputted to the line interface 22A is rewritten with respect to the header H to a transport channel number TCN (such as TCNA2-C1) uniquely defined between the nodes A and C and transferred to the node C through the multiplexing line corresponding to the number TCN and further to the line interface 21C of the node C.

(4) One packet inputted to the line interface 21B of the node B is further rewritten with respect to the header H to an access channel number ACN (such as ACNB1) uniquely defined in the node B.

(5) For this reason, one packet, when outputted from the line interface 21B, is also automatically branched into the terminal and line interfaces 11B and 22B of the node B as one and the other packets.

(6) One packet branchedly inputted to the terminal interface 11B is subjected at the terminal interface 11B to a predetermined selection processing (such as selection of one of preset logical channels) and then outputted to the packet terminal 1B specified as one of the broadcasting communication destinations.

(7) The other packet branchedly inputted to the line interface 22B is rewritten with respect to its header H to a transport channel number TCN (such as TCNB2-D1) uniquely defined between the nodes B and D and then transferred to the node D through the multiplexing line corresponding to the number TCN and further to the line interface 21D of the node D.

(8) The packet inputted to the line interface 21D of the node is further rewritten with respect to its header H to an access channel number ACN (such as ACND1) uniquely defined in the node D.

(9) For this reason, the packet, when outputted from the line interface 21D, is automatically branched into the terminal interfaces 11D and 12D of the node D.

(10) The branched packets inputted to the terminal interfaces 11D and 12D are subjected at the interfaces 11D and 12D also to the above predetermined selection processing and then sent out to the packet terminals 1D1 and 1D2 specified as ones of the broadcasting communication destinations.

(11) The other packet inputted to the line interface 21C of the node C through the above procedure (3) is also subjected, during its transfer, to processings substantially the same as those in the above procedures (4) to (10) and then outputted to the packet terminals 1C, 1E1 and 1E2 specified as ones of the broadcasting communication destinations.

In this way, in accordance with the present embodiment, a broadcasting packet issued from a caller terminal is automatically transferred by branching to a plurality of desired destinations while the need for such processing as data copy processing mentioned earlier is eliminated. This results in that load concentration to a specific module or board, which would undesirably take place in the prior art broadcasting packet communication system, can be favorably avoided. In addition, the occupation factor of the switches or multiplexing lines can also be made low.

Even in the case where it is desired to carry out a plurality of such broadcasting packet communications in parallel between a plurality of different pairs of packet terminals or to carry out the broadcasting and non-broadcasting packet communications in parallel, these parallel, plural packet communications can be suitably processed on a time division basis to realize substantially the same processings and effects as in the above case, so long as the following two conditions are satisfied for connection formation with respect to basically one (one group of) broadcasting packet communication(s).

With respect to a packet to be transferred between terminal and line interfaces, a connection identifier uniquely defined in the associated packet switching node should be attached to the header of the packet. (In the case of the non-broadcasting packet communication, follow the manner mentioned in FIG. 3.)

With respect to a packet to be transferred between line interfaces through multiplexing lines, a connection identifier uniquely defined between the adjacent packet switching nodes should be attached to the header of the packet. (In the case of the non-broadcasting packet communication, follow the manner mentioned in FIG. 3.)

Figure 6:
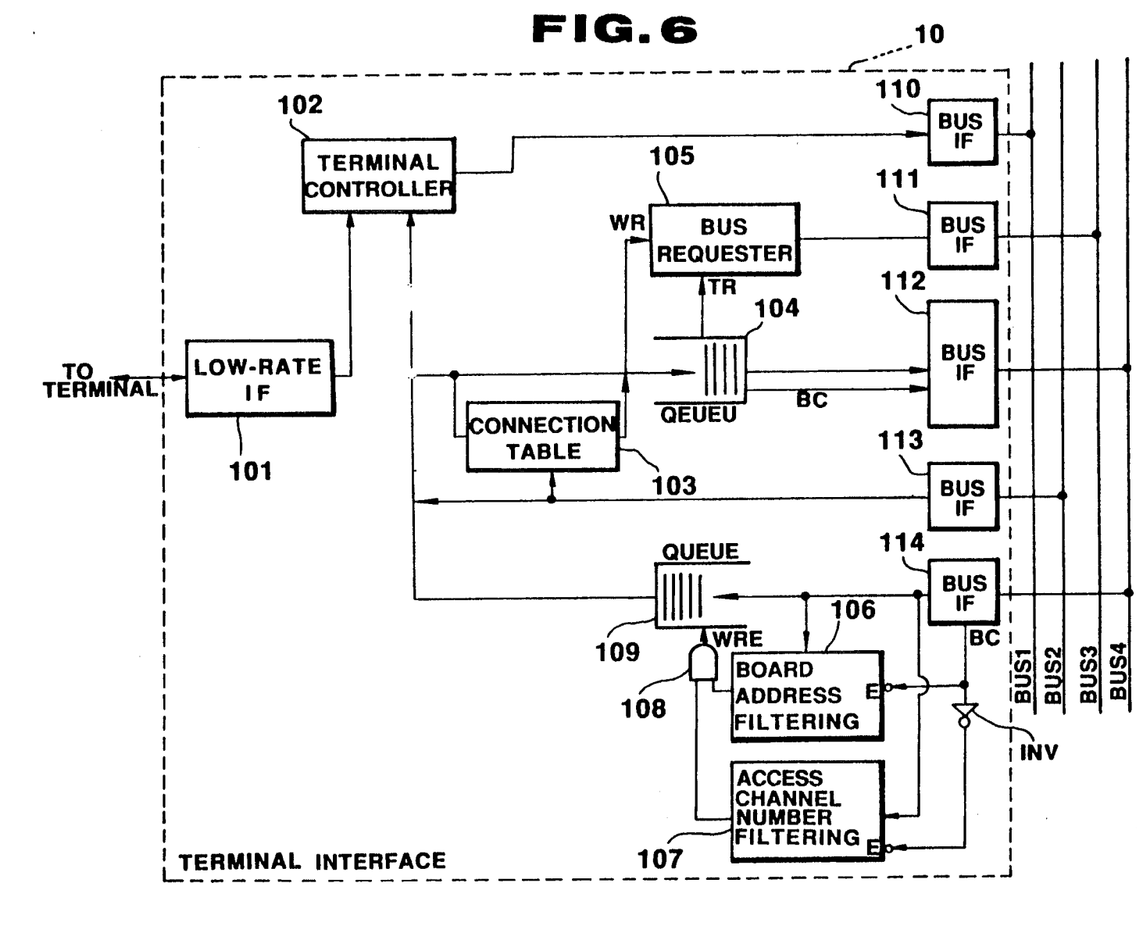
FIG. 6 is a block diagram showing an exemplary arrangement of one of terminal interfaces used in the packet communication system of the present invention.
Figure 7:
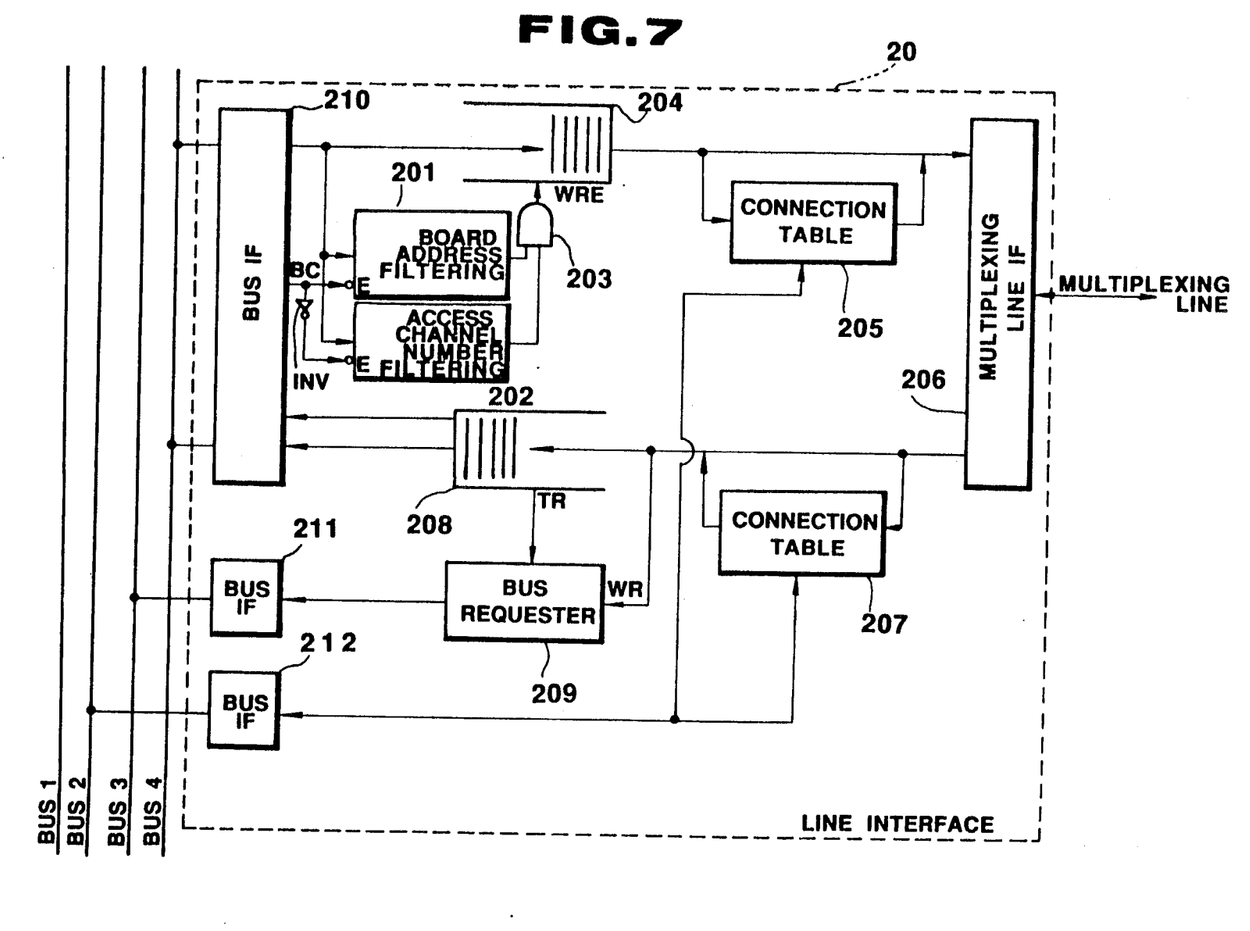
FIG. 7 is a block diagram showing an exemplary arrangement of one of line interfaces used in the packet communication system of the present invention.

FIGS. 6 and 7 show specific examples of arrangements of terminal and line interfaces in one of the packet switching nodes used to establish connections in a broadcasting packet communication system, respectively. The overall configuration of each of the packet switching nodes is substantially the same as that shown in FIG. 1.

Explanation will first made as to the arrangements of the terminal and line interfaces 10 and 20 of FIGS. 6 and 7 as well as the functions of constituent elements therein.

With the terminal interface 10 of FIG. 6, a low-rate interface 101 is used to accurately transfer various sorts of data (including a calling data, a data packet and so on) between the terminal interface 10 and the packet terminal connected through a low-rate line. More in detail, the interface 101 comprises communication LSI and DMA controllers for transfer of such data.

The terminal interface 10 also includes a terminal controller 102 which functions to control the data transfer between the interface 10 and the packet terminal connected through the low-rate interface 101 and when receiving a connection request or the like from the same packet terminal, to control mainly the basic operation of the interface 10 such as the notification of the presence of the interrupt request to the node controller (refer to FIG. 1) through the interrupt control bus BUS1; a connection table 103 in which the access channel number ACN as the connection identifier or the like is registered through the connection establishing operation of the node controller (refer to FIG. 1) in the call setting mode; a queue matrix 104 in which a data packet outputted onto the data bus BUS4 is temporarily stored on a first-in first-out basis; a bus requester 105 which grasps the number of packets accumulated in the queue matrix 104 on the basis of packet write and transmit signals WR and TR with respect to the queue matrix 104 respectively received from the connection table 103 and the matrix 104 and which issues, in the presence of accumulated packets, an access request (use request) to the data bus BUS4, via the access control bus BUS3 to the bus access controller (refer to FIG. 1). It will be appreciated from the foregoing explanation that the data bus BUS4 can be used only when an access authority is obtained based on the control and meddiation of the bus access controller. When the caller packet terminal connected to the terminal interface 10 specifies the above broadcasting packet communication, the queue matrix 104 issues a broadcast signal BC to the data bus BUS4 to assert the signal BC.

The terminal interface 10 further includes a board address filtering circuit 106 which checks whether a board address BA attached as one of the connection identifiers to the packet received through the data bus BUS4 is destined for its own board (its own terminal interface) and which, when the address BA is directed to its own board, issues a signal having a logical value "1"; an access channel number filtering circuit 107 which checks whether the access channel number ACN attached as the connection identifier to the packet received through the data bus BUS4 coincides with the broadcasting access channel number ACN being used in the associated node and which, when the attached access channel number ACN coincides with the broadcasting access channel number ACN, issues a signal having a logical value "1"; an AND circuit 108 which performs a logical "AND" operation of the output signals of the board address and access channel number filtering circuits 106 and 107 and when the logical "AND" condition is satisfied, which outputs a write enable signal WRE having a logical value "1"; and another queue matrix 109 which, when receiving the write enable signal WRE from the AND circuit 108, takes in a packet through the data bus BUS4 and temporarily stores the packet therein on a first-in first-out basis. A data packet issued from the queue matrix 109 is transferred to the caller packet terminal through the terminal controller 102 and low-rate interface 101.

In the illustrated embodiment, the board-address and access-channel-number filtering circuits 106 and 107 perform basically such processes as mentioned above, but actually cooperatively carry out the following operations which are related to each other depending on the presence or absence of the asserted broadcast signal BC, that is, on the specified broadcasting or non-broadcasting packet communication.

That is, the board-address and access-channel-number filtering circuits 106 and 107 cooperatively control the activation or inactivation of the above processes depending on the states (which are different at the circuits 106 and 107 due to an inverter INV) of the broadcast signal BC applied to enable terminals E of the circuits 106 and 107 through the data bus BUS4. For example, when the broadcast signal BC is actually asserted, that is, when the broadcasting packet communication is specified, the board-address and access-channel-number filtering circuits 106 and 107 cooperatively operate as follows.

The board address filtering circuit 106 becomes inactive to maintain its output to the AND circuit 108 to have unconditionally a logical "1".

The access channel number filtering circuit 107 becomes active to execute the checking operation of the access channel number ACN each time it receives a data packet.

When the broadcast signal BC is not asserted, that is, when the non-broadcasting packet communication is specified, on the contrary, the board-address and access-channel-number filtering circuits 106 and 107 operate as follows.

The board address filtering circuit 106 becomes active to execute its checking operation of the board address BA each time it receives a data packet.

The access channel number filtering circuit 107 becomes inactive to maintain its output to the AND circuit 108 to have unconditionally a logical value "1".

As a result, the packet writing operation to the queue matrix 109 is controlled on the basis of the check results of the access channel number filtering circuit 107 when the broadcasting packet communication is specified; whereas the packet writing operation to the queue matrix 109 is controlled on the basis of the check results of the board address filtering circuit 106 when the non-broadcasting packet communication is specified.

The terminal interface 10 also includes bus interfaces 110 to 114 which, as well known, act to transfer various sorts of data between the terminal interface 10 and the buses BUS1 to BUS4.

The line interface 20 of FIG. 7, on the other hand, includes a board address filtering circuit 201 basically similar to the board address filtering circuit 106, which checks whether the board address BA attached as one of the connection identifiers to the packet accepted through the data bus BUS4 is destined for its own board (its own line interface) and which, when the board address BA is destined for its own board, outputs a signal having a logical value "1"; an access channel number filtering circuit 202 basically similar to the access channel number filtering circuit 107, which checks whether the access channel number ACN attached as the connection identifier to the packet accepted through the data bus BUS4 coincides with the broadcasting access channel number ACN being used in the associated line interface and which, when the accepted number ACN coincides with the broadcasting number ACN in the associated line interface, outputs a signal having a logical value "1"; an AND circuit 203 which performs a logical "AND" operation of the output signals of the board-address and access-channel-number filtering circuits 201 and 202 and which, when the logical "AND" condition is satisfied, outputs the write enable signal WRE having a logical value "1"; and a queue matrix 204 which, when receiving the write enable signal WRE from the AND circuit 203, takes in the packet accepted through the data bus BUS4 and temporarily stores the packet therein on a first-in first-out basis. The board-address and access-channel-number filtering circuits 201 and 202 also perform substantially the same operations as those of the board-address and access-channel-number filtering circuits 106 and 107 in the terminal interface 10 on the basis of the state of the broadcast signal BC. Therefore, in the case of the specified broadcasting packet communication, the packet writing operation to the queue matrix 204 is controlled on the basis of the check results of the access channel number filtering circuit 202; while, in the case of the specified non-broadcasting packet communication, the packet writing to the queue matrix 204 is controlled on the basis of the check results of the board address filtering circuit 201.

The line interface 20 also includes a connection table 205 in which a transport channel number TCN previously set with respect to the adjacent node in association with a predetermined access channel number ACN is registered in the call setting mode; a multiplexing line interface 206 which transfers various sorts of data between the line interface 20 and multiplexing lines; a connection table 207 in which a predetermined access channel number ACN is registered in association with the transport channel number TCN previously set with respect to the adjacent node through the connection establishing operation of the node controller (refer to FIG. 1) in the call setting mode; a queue matrix 208 in which a data packet outputted onto the data bus BUS4 is temporarily stored on a first-in first-out basis; a bus requester 209 which grasps the number of packets accumulated in the queue matrix 208 on the basis of packet write and transmit signals WR and TR with respect to the matrix 208 received from the matrix 208 and the multiplexing line interface 206 and which, in the presence of accumulated packets, issues an access request (use request) to the data bus BUS4, to the bus access controller (refer to FIG. 1) through the access control bus BUS3.

The line interface 20 further includes bus interfaces 210 to 212 which act, as well known, to transfer various data between the line interface 20 and the buses BUS1 to BUS4.

Next, explanation will be directed to the specific operations of the terminal and line interfaces 10 and 20.

Assume now that such a so-called 1:1 packet communication of the non-broadcasting type as explained, e.g., in FIG. 3 through the terminal and line interfaces 10 and 20. In such a call setting mode, through the connection establishing operation of the node controller (refer to FIG. 1), the board address BA of the line interface of the next data-packet receiver and the predetermined access channel number ACN uniquely defined in the associated board are desribed and registered as the connection identifiers in the connection table 103 of the terminal interface 10 (corresponding to the terminal interface 11A in FIG. 3) in association with the logical channel number LCN of the corresponding packet terminal (more accurately in association with the temporary access channel number ACN previously set as associated with the theoretical channel number LCN at the time of making the system) in the data-packet transmitter node. Meanwhile, in the connection table 205 of the line interface 20 (corresponding to the line interface 21A in FIG. 3), a transport channel number TCN previously set with respect to the adjacent node in association with the predetermined access channel number ACN uniquely defined in the associated board are described and registered as the connection identifier. In the data-packet reciever nodes (including relay nodes) of the call setting mode, through the connection establishing operation of the node controller (refer to FIG. 1), the board address BA of the line interface (in the case of the relay) or terminal interface (corresponding to the terminal interface 11B in FIG. 3) of the next data-packet receiver and the predetermined access channel number ACN uniquely defined in the associated board are desribed and registered as the connection identifiers in the connection table 207 of the line interface 20 (corresponding to the line interface 21B in FIG. 3) in association with the transport channel number TCN previously set with respect to the adjacent node. Further, in such non-broadcasting packet communication, the board address filtering circuits 106 and 201 of the terminal and line interfaces 10 and 20 are set active.

In this case, therefore, the data packet, after transferred from the packet terminal to the low-rate interface 101 of the terminal interface 10 (corresponding to the terminal interface 11A in FIG. 3), is first sent to the terminal controller 102 where the logical channel number LCN attached to the header H (refer to FIG. 2) of the data packet is rewritten to the access channel number ACN previously set as associated therewith at the time of making of the system. Then, the rewritten access channel number ACN of the packet data is further rewritten at the node controller (refer to FIG. 1) to the board address BA of the line interface of the next data-packet receiver and the predetermined access channel number ACN uniquely defined in the associated board, through the look-up operation of the connection table 103.

And the data packet subjected to the above rewriting operation of the connection identifiers is once written in the queue matrix 104 and thereafter transferred onto the data bus BUS4 through the bus interface 112, under such a condition that it can acquire the access authority through the access request of the bus requester 105 to the data bus BUS4. The data packet thus transferred onto the data bus BUS4 is inputted to the line interface 20 (corresponding to the line interface 21A in FIG. 3).

The data packet inputted to the line interface 20 is first received at the bus inteface 210 to be subjected thereat to the aforementioned checking operation of the board address BA through the board address filtering circuit 201 of its activated state.

As a result of the checking operation, when the board address filtering circuit 201 determines that the data packet is not directed to its own board (the line interface 20), the data packet is discarded and inputted to another line interface having a broad address coincident with a board address BA which has been added as one of the connection identifiers to the data packet node. When the filtering circuit 201 determines that the data packet is directed to its own board as a result of its checking operation, this causes the AND circuit 203 to output the write enable signal WRE that is then rewritten (taken) in the queue matrix 204 in the associated line interface.

The access channel number ACN attached to the header H of the data packet thus rewritten in the queue matrix 204 is further rewritten at the node controller (refer to FIG. 1) to the transport channel number TCN previously set with respect to the next data-packet receiver node next thereto, through its look-up operation of the connection table 205, and the header-rewritten data packet is then outputted onto the multiplexing line (adjacent node) through the multiplexing line interface 206.

In this way, even in the adjacent node to which the data packet is to be transferred or the node for which the data packet is destined, the data packet is sequentially subjected to the rewriting operation of its connection identifiers of the data, the checking operation of the board address and so on through the other routes of the line and terminal interfaces 20 and 10 in substantially the same manner as in the above. And in the data-packet destination noode, the data packet written in the queue matrix 109 of the terminal interface (corresponding to the terminal interface 11B in FIG. 3) connected with the destination packet terminal is rewritten to a packet having a header to which the predetermined logical channel number LCN previously set through the terminal controller 102 is attached, and the header-rewritten packet is sent to the destination packet terminal.

The operations of the terminal and line interfaces 10 and 20 in the broadcasting packet communication mode will next be explained.

Assume now that such a so-called 1:N packet communication of the broadcasting type as explained in FIG. 5 through the terminal and line interfaces 10 and 20. In such a call setting mode, through the connection establishing operation of the node controller (refer to FIG. 1), the predetermined access channel number ACN uniquely defined in the association node is described and registered as the connection identifier in the connection table 103 of the terminal interface 10 (corresponding to the terminal interface 11A in FIG. 5) in association with the logical channel number LCN of the corresponding packet terminal (more accurately in association with the temporary access channel number ACN previously set as associated with the theoretical channel number LCN at the time of making the system) in the data-packet transmitter node (node A in FIG. 5). Meanwhile, in the connection tables 205 of the line interfaces 20 (corresponding to the line interfaces 21A and 22A in FIG. 5), the transport channel numbers TCN previously set with respect to the adjacent nodes in association with the predetermined access channel number ACN defined in the associated node are described and registered as the connection identifiers.

In the data-packet receiver nodes (nodes B to E in FIG. 5) including relay nodes in the call setting mode, through the connection establishing operation of the node controller (refer to FIG. 1), the predetermined access channel number ACN uniquely defined in the associated board is described and registered as the connection identifier in the connection tables 207 of the line interfaces 20 (corresponding to the line interfaces 21B, 21C, 21D and 21E in FIG. 5) of data receivers from the multiplexing lines in association with the transport channel numbers TCN previously set with respect to the adjacent nodes. Further, in the connection tables 205 of the line interfaces 20 (line interfaces 22B and 22C in FIG. 5) of data transmitters to the multiplexing lines, the transport channel numbers TCN previously set with respect to the adjacent nodes are described and registered as the connection identifiers in association with the predetermined access channel number ACN uniquely defined in the associated node. Similarly, in the connection tables 103 of the terminal interfaces (corresponding to the terminal interfaces 11B, 11C, 11D, 12D, 11E and 12E in FIG. 5) of the packet receiver nodes (nodes B to E) connected respectively with the destination packet terminals, the logical channel numbers LCN of the destination packet terminals (more accurately, the temporary access channel numbers ACN previously associated with the logical channel numbers LCN at the time of making the system) are described and registered in association with the predetermined access channel numbers ACN uniquely defined in the associated nodes.

Further, in the broadcasting packet communication mode, the asserted broadcast signal BC causes the access channel number filtering circuits 107 and 202 of the each terminal and line interfaces 10 and 20 to be activated.

In this case, therefore, the broadcasting data packet, after transferred from the packet terminal to the low-rate interface 101 of the terminal interface 10 (corresponding to the terminal interface 11A), is first sent to the terminal controller 102 where the logical channel number LCN attached to the header H (refer to FIG. 2) of the data packet is rewritten to the access channel number ACN previously set as associated therewith at the time of making of the system. Then, the rewritten access channel number ACN of the packet data is further rewritten at the node controller (refer to FIG. 1) to the predetermined access channel number ACN uniquely defined in the associated node, through the look-up operation of the connection table 103.

And the broadcasting data packet subjected to the above rewriting operation of the connection identifiers is once written in the queue matrix 104 and thereafter transferred onto the data bus BUS4 through the bus interface 112, under such a condition that it can acquire the access authority through the access request of the bus requester 105 to the data bus BUS4. The broadcasting data packet thus transferred onto the data bus BUS4 is inputted to the line interfaces 20 (corresponding to the line interfaces 21A and 22A in FIG. 5).

The data packet inputted to the line interface 20 is first recieved at the bus interface 210 to be subjected thereat to the aforementioned checking operation of the access channel number ACN through the access channel number filtering circuit 202 of its activated state.

As a result of the checking operation, when the the access channel number filtering circuit 202 determines that the access channel number ACN does not coincide with the broadcasting one ACN being used in the associated node, that is, when the data packet is not the broadcasting one or is a broadcasting data packet being executed parallelly thereto in another broadcasting communication, the data packet is discarded and inputted to another line interface to which the data packet to be sent. When the access channel number filtering circuit 202 determines that the access channel number ACN coincides with the broadcasting one ACN being used in the associated node as a result of its checking operation, this causes the AND circuit 203 to output the write enable signal WRE that is then rewritten (taken) in the queue matrix 204 in the associated line interface.

The access channel number ACN attached to the header H of the broadcasting data packet thus rewritten in the queue matrix 204 is further rewritten at the node controller (refer to Fig. 1) to the transport channel number TCN previously set between the present node and the next data-packet receiver node next thereto, through its look-up operation of the connection table 205, and the header-rewritten data packet is then outputted onto the multiplexing line (adjacent node) through the multiplexing line interface 206.

In this way, even in the adjacent node to which the data packet is to be transferred or the node for which the data packet is destined, the data packet is sequentially subjected to the rewriting operation of its connection identifiers of the data, the checking operation of the access channel number and so on through the other routes of the line and terminal interfaces 20 and 10 or through the similar routes to the above only for the line interfaces (corresponding to the line interfaces 22B and 22C in Fig. 5) of relay nodes as data transmitters to the multiplexing lines. And in the data-packet destination node, the data packet written in the queue matrix 109 of the terminal interface connected with the destination packet terminal is rewritten to a packet having a header to which the predetermined logical channel number LCN previously set through the terminal controller 102 is attached, and the header-rewritten packet is sent to the destination packet terminal.

As has been explained in the foregoing, the use of the terminal and line interfaces of Figs. 6 and 7 enables the flexible realization of a previously specified mode of packet communication, regardless of the fact that the packet is of a broadcasting or non-broadcasting type. In the broadcasting packet communication, in particular, there can be easily realized such an efficient packet communication as shown in Fig. 5.

The broadcasting or non-broadcasting operational mode has been switched depending on the presence or absence of the asserted broadcast signal BC in the foregoing embodiment. However, when a data indicative of the designation of the broadcasting or non-broadcasting packet communication is attached to the header of the data packet, the need for the broadcast signal may be eliminated. In this case, the terminal and line interfaces 10 and 20 determine, on the basis of the contents of the attached data, whether to activate the access-channel-number or board-address filtering circuit.

What is claimed is:

1. A connection establishing method for a broadcasting packet communication in which data is transferred in the form of a packet from one packet terminal to a plurality of packet terminals simultaneously, the broadcasting packet communication being operative in a packet switching network comprising a plurality of packet switching nodes connected to each other through mutiplexing lines, each of the packet switching nodes controlling an associated group of packet terminals, each of the packet switching nodes having one or a plurality of terminal interfaces for exchanging data between the packet switching node and its associated group of the packet terminals; one of a plurality of line interfaces exchanging data between an associated one of the multiplexing lines and the packet exchange node; and bus lines provided in the packet exchange node, for connecting the interfaces to each other, the steps of the connection establishing method comprising:

defining first connection data concerning connection between a packet exchange node and an adjacent packet exchange node connected to the packet exchange node for establishing a communication line of the broadcasting packet communication;

registering the ·st connection data into respective line interfaces associated with the communication line thus established;

defining second connection data having a unique content in the packet exchange node concerning connection between a terminal interface associated with a packet exchange node serving as an originating party or a destination party of the broadcasting packet communication and a line interface associated with the established communication;

registering the second connection data into the terminal interface and the line interface; and sequentially determining next destinations of the packet to be transferred according to the connection content indicated by the first and second connection data.

2. The connection establishing method of claim 1, wherein the connection content indicated by the first and second connection data is added or updated in the packet as an identifier for the destination of the packet, and wherein the identifier added in the packet is checked at the terminal interface and the line interface to determine whether it is an identifier used for the broadcasting packet communication currently performed in the associated packet exchange node, and the packet is permitted to enter the terminal and the line interface only when the identifier added in the packet is an identifier used for the broadcasting packet communication.

3. A broadcasting packet communication system capable of automatically distributing a packet in a packet switching network comprising:

a plurality of packet switching nodes connected to each other through multiplexing lines, each of the packet switching nodes controlling an associated group of packet terminals, each of the packet switching nodes further including:

one or a plurality of terminal interfaces each exchanging data packets between the associated group of packet terminals and the packet switching node, one or a plurality of line interfaces each exchanging data packets between an associated one of the multiplexing lines and the packet exchange node, and bus lines provided in the packet exchange node connecting the terminal and line interfaces to each other;

means for adding data indicative of a terminal interface or a line interface to which a broadcasting data packet is to be transferred next as a destination identifier of a next destination;

each of the terminal interfaces including:

a connection table for registering first connection data for indicating a connection to a packet terminal to which the terminal interface is connected, and second connection data for indicating a specific connection form uniquely defined in a packet exchange node to which the packet interface belongs, means for checking whether a destination identifier attached to a packet to be entered through the bus lines corresponds to the second connection data registered in the connection table, and for permitting the packet to enter the associated terminal interface when the destination identifier corresponds to the second connection data, and control means for respectively rewriting the destination identifier to an identifier corresponding to the second connection data for a packet to be entered from the packet terminals or to an identifier corresponding to the first connection data for the packet permitted to enter to which a destination identifier corresponding to the second connection data is attached while referring to the connection table, and for transferring the packet to a bus line or a packet terminal; and each of the line interfaces including:

a first connection table for registering a third connection data for indicating a specific connection form uniquely defined in the packet exchange node to which the line interface belongs, and a fourth connection data for indicating a specific connection form uniquely defined in adjacent packet exchange nodes, a second connection table for registering a fifth connection data for indicating a specific connection form uniquely defined in adjacent packet exchange nodes, and a sixth connection data for indicating a specific connection form uniquely defined in a packet exchange node to which the line interface belongs, means for checking whether a destination identifier attached to a packet to be entered through the bus lines corresponds to the third connection data registered in the first connection table, and for permitting the packet to enter the associated line interface when the destination identifier corresponds to the third connection data, and control means for rewriting the destination identifier to an identifier corresponding to the fourth connection data for a packet permitted to be entered while referring to the first connection table and for transferring the packet to the multiplexing line, and for rewriting the destination identifier to an identifier corresponding to the sixth connection data for a packet to which a destination identifier corresponding to the fifth connection data is attached while referring to the second connection table and for transferring the packet to the bus line.

4. The broadcasting packet communication system set forth in claim 3, wherein when the terminal and line interfaces are provided in the same packet switching node and are specified in a packet transfer route of the same packet communication, the second, third and sixth connection data have an identical connection content.

* * * * *